United States Patent
Singh et al.

(10) Patent No.: US 7,263,260 B2
(45) Date of Patent: Aug. 28, 2007

(54) LOW COST, HIGH PRECISION MULTI-POINT OPTICAL COMPONENT ATTACHMENT

(75) Inventors: Rajminder Singh, Shrewsbury, MA (US); Michael Powers, Amherst, NH (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/079,127

(22) Filed: Mar. 14, 2005

(65) Prior Publication Data

US 2006/0204177 A1    Sep. 14, 2006

(51) Int. Cl.
G02B 6/26    (2006.01)
G02B 6/00    (2006.01)

(52) U.S. Cl. .............................. 385/52; 385/49; 385/97

(58) Field of Classification Search .................... None
See application file for complete search history.

(56) References Cited

U.S. PATENT DOCUMENTS

| | | | |
|---|---|---|---|
| 4,008,948 A | 2/1977 | Dalgleish et al. |
| 4,174,491 A | 11/1979 | Nakamura et al. |
| RE30,348 E | 7/1980 | Hascoe |
| 4,237,474 A | 12/1980 | Ladany |
| 4,500,165 A | 2/1985 | Scholl et al. |
| 4,663,652 A | 5/1987 | Nishizawa |
| 4,702,547 A | 10/1987 | Enochs |
| 4,741,796 A | 5/1988 | Althaus et al. |
| 4,778,241 A | 10/1988 | Haltenorth |
| 4,779,788 A | 10/1988 | Rossberg |
| 4,798,439 A | 1/1989 | Preston |
| 4,807,956 A | 2/1989 | Tournereau et al. |
| 4,818,056 A | 4/1989 | Enochs et al. |
| 4,955,683 A | 9/1990 | Shiga et al. |
| 4,984,866 A | 1/1991 | Boisgontier et al. |
| 5,033,052 A | 7/1991 | Masuko et al. |
| 5,077,878 A | 1/1992 | Armiento et al. |
| 5,163,108 A | 11/1992 | Armiento et al. |
| 5,227,646 A | 7/1993 | Shigeno |
| 5,228,101 A | 7/1993 | Lebby et al. |
| 5,345,529 A | 9/1994 | Sizer, II et al. |
| 5,412,748 A | 5/1995 | Furuyama et al. |
| 5,535,296 A | 7/1996 | Uchida |
| 5,559,918 A | 9/1996 | Furuyama et al. |
| 5,602,955 A | 2/1997 | Haake |
| 5,619,609 A | 4/1997 | Pan et al. |
| 5,745,624 A | 4/1998 | Chan et al. |
| 5,768,456 A | 6/1998 | Knapp et al. |

(Continued)

FOREIGN PATENT DOCUMENTS

EP    0346596 A2    12/1989

(Continued)

Primary Examiner—Sung Pak
(74) Attorney, Agent, or Firm—RatnerPrestia (57) ABSTRACT

A method for precisely aligning a first optical component to a second optical component that is coupled to a substrate. At least one of a number of coupling elements is modified to attach the first optical component to the substrate. An optical coupling quality of the first optical component to the second optical component is determined. At least one of the modified coupling elements that couples the first optical component to the substrate is micro-manipulated to precisely align the first optical component with the second optical component and improve the optical coupling quality.

22 Claims, 8 Drawing Sheets

U.S. PATENT DOCUMENTS

| | | |
|---|---|---|
| 5,881,198 A | 3/1999 | Haake |
| 5,896,481 A | 4/1999 | Beranek et al. |
| 5,962,086 A | 10/1999 | Offen |
| 5,966,488 A | 10/1999 | Miura et al. |
| 6,006,639 A | 12/1999 | Cherbettchian |
| 6,019,523 A * | 2/2000 | Honmou ................ 385/94 |
| 6,146,025 A | 11/2000 | Abbink et al. |
| 6,164,837 A | 12/2000 | Haake et al. |
| 6,207,950 B1 | 3/2001 | Verdiell |
| 6,216,939 B1 | 4/2001 | Thackara |
| 6,282,350 B1 | 8/2001 | Takahashi et al. |
| 6,411,759 B1 * | 6/2002 | Beguin et al. ............ 385/49 |
| 6,415,167 B1 | 7/2002 | Blank et al. |
| 6,440,776 B1 | 8/2002 | Musk |
| 6,443,171 B1 | 9/2002 | Schneider et al. |
| 6,516,130 B1 * | 2/2003 | Jang ..................... 385/136 |
| 6,614,605 B2 | 9/2003 | Auracher et al. |
| 6,623,180 B2 | 9/2003 | Panicker et al. |
| 6,652,158 B2 | 11/2003 | Bartur et al. |
| 6,883,978 B2 | 4/2005 | Powers |
| 2001/0010742 A1 | 8/2001 | Nakagawa et al. |
| 2002/0110328 A1 | 8/2002 | Bischel et al. |
| 2003/0210866 A1 | 11/2003 | Kuhara et al. |
| 2003/0223709 A1 | 12/2003 | Lake et al. |
| 2004/0124345 A1 | 7/2004 | Sell |
| 2004/0223721 A1 | 11/2004 | Flanders et al. |
| 2004/0264886 A1 | 12/2004 | Powers |
| 2005/0013558 A1 | 1/2005 | Powers |
| 2005/0051598 A1 | 3/2005 | Heminway et al. |
| 2005/0111794 A1 * | 5/2005 | Wang et al. ............... 385/52 |
| 2005/0129371 A1 * | 6/2005 | Massey .................... 385/91 |
| 2005/0271332 A1 * | 12/2005 | Massey .................... 385/91 |

FOREIGN PATENT DOCUMENTS

| | | |
|---|---|---|
| JP | 01270012 A | 10/1989 |
| JP | 403095881 A | 4/1991 |

* cited by examiner

LOW COST, HIGH PRECISION MULTI-POINT OPTICAL COMPONENT ATTACHMENT

FIELD OF THE INVENTION

The present invention relates generally to a method for precisely attaching multiple optical components to each other and, in particular, to a method of aligning a first optical component with a second optical component by micro-manipulating at least one of a plurality of coupling elements which couple the first optical component to a substrate.

BACKGROUND OF THE INVENTION

The importance of achieving highly accurate mutual alignment of individual components in any optical system is well known. The miniature dimensions of components used in modern optical communication systems render such accurate alignment difficult both to achieve and to maintain. For example, one issue of concern in the construction of laser transmitters is that of efficiently coupling the optical output from a laser diode into an optical fiber. To obtain efficient coupling, the fiber end is desirably precisely aligned with the emitting area of the laser. Precise alignment of addition optical components between the laser diode and the optical fiber, such as lens, modulators, or optical isolators, may also be desired. When such alignment is achieved, the fiber is then fixed in place, desirably by a method that enables the desired alignment to be sustained throughout the device lifetime.

Typically, fiber-coupled diode lasers are packaged in metal butterfly packages, which may be gold plated, and the fiber is held in alignment with the laser using one of the epoxy, laser weld, or solder attachment techniques with or without a ferrule. Epoxy attachment is low cost but may have too much thermal expansion for high precision attachments. Furthermore, it may not be reliable over a long period of time due to outgassing and alignment shifts arising from aging and temperature cycling. Laser weld techniques are reliable but use costly ferrulization of the fiber and specially designed mounts or clips to allow weld attachment of the ferrulized fiber. The mounts/clips are expensive, large, and may creep over time. Solder attachment techniques, on the other hand, are reliable and low cost, and have become prevalent in the art. Existing solder attachment techniques however, tend to use an integrated heating mechanism and/or a specially configured platform to isolate the heat used for solder reflow. These thermal management means may be expensive and/or undesirably large.

The mounting point at which the fiber is soldered desirably has specific material properties in order to work effectively. The material of the mounting point desirably has a low thermal conductivity (e.g. less than 50 W/m-K) and a sufficiently low thermal expansion coefficient to substantially maintain fiber alignment when the package is heated during operation, or due to environmental effects. The exact thermal expansion property desired may depend on a number of parameters including: the material to which the laser is mounted; the respective thickness of the fiber mount and laser submount; and/or the temperature profiles expected during operation. The fiber mount material also may be able to be soldered or be able to be plated with a solderable material. During the soldering process, the fiber mount may experience significant stress resulting from differential expansion due to temperature gradients and materials differences. Therefore, the fiber mount desirably has a high tensile strength (e.g. greater than 25 kpsi) to avoid fracturing.

It is difficult, however, to maintain alignment between the optical component and the fiber when the fiber is soldered due to turbulent flows and capillary forces exhibited by the molten solder. Other methods of post-solder adjustments may include the undesirable addition of costly and complicated tooling (e.g., grippers) and high precision linear or rotary stages. The pending U.S. patent application Ser. No. 10/858,894 to Singh et al., entitled NON-MECHANICAL ADJUSTMENT OF AN OPTICAL FIBER TO AN OPTICAL OUTPUT, addresses some of these problems by a method of aligning an optical fiber to an adjacent optical source by adjusting the fiber at least vertically toward a desired position. Therefore, the invention to Singh et al. teaches alignment by moving the optical component in only one direction by localized destressing of the solder used to hold the optical fiber.

To achieve the desired alignment accuracies for the optical coupling of many optical components it may be necessary for the optical components to be precisely aligned along two, or three, axes. For these optical component attachments, a method of performing multi-directional alignment is needed.

SUMMARY OF THE INVENTION

To meet this and other needs, and in view of its purposes, the present invention is embodied in an exemplary method for precisely aligning a first optical component to a second optical component that is coupled to a substrate. This method includes aligning the first optical component with the second optical component by micro-manipulating at least one of a number of coupling elements that couple the first optical component to the substrate.

Alternatively, the present invention is embodied in a method for attaching a first optical component onto a substrate such that the first optical component is precisely aligned with a second optical component coupled to the substrate. The exemplary method includes aligning the first optical component with the second optical component and selecting a plurality of attach point locations at which to couple the first optical component to the substrate. A coupling element is placed at each of the attach point locations. The plurality of coupling elements are modified such that the modified coupling elements attach the first optical component to the substrate. An optical coupling quality of the first optical component to the second optical component is determined when the plurality of modified coupling elements have set. At least one of the modified coupling elements is micro-manipulated to realign the first optical component with the second optical component and improve the optical coupling quality. This micro-manipulation may include a number of processes, such as reallocation of stress, re-melting, or reallocation of grain boundaries.

The present invention is also embodied in an exemplary optical assembly which includes a substrate, a plurality of coupling elements including at least one micro-manipulated coupling element, a first optical component coupled to the substrate by the coupling elements and a second optical component coupled to the substrate. The first optical component is precisely aligned with the second optical component to achieve a predetermined optical coupling quality using the micro-manipulated coupling element(s).

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
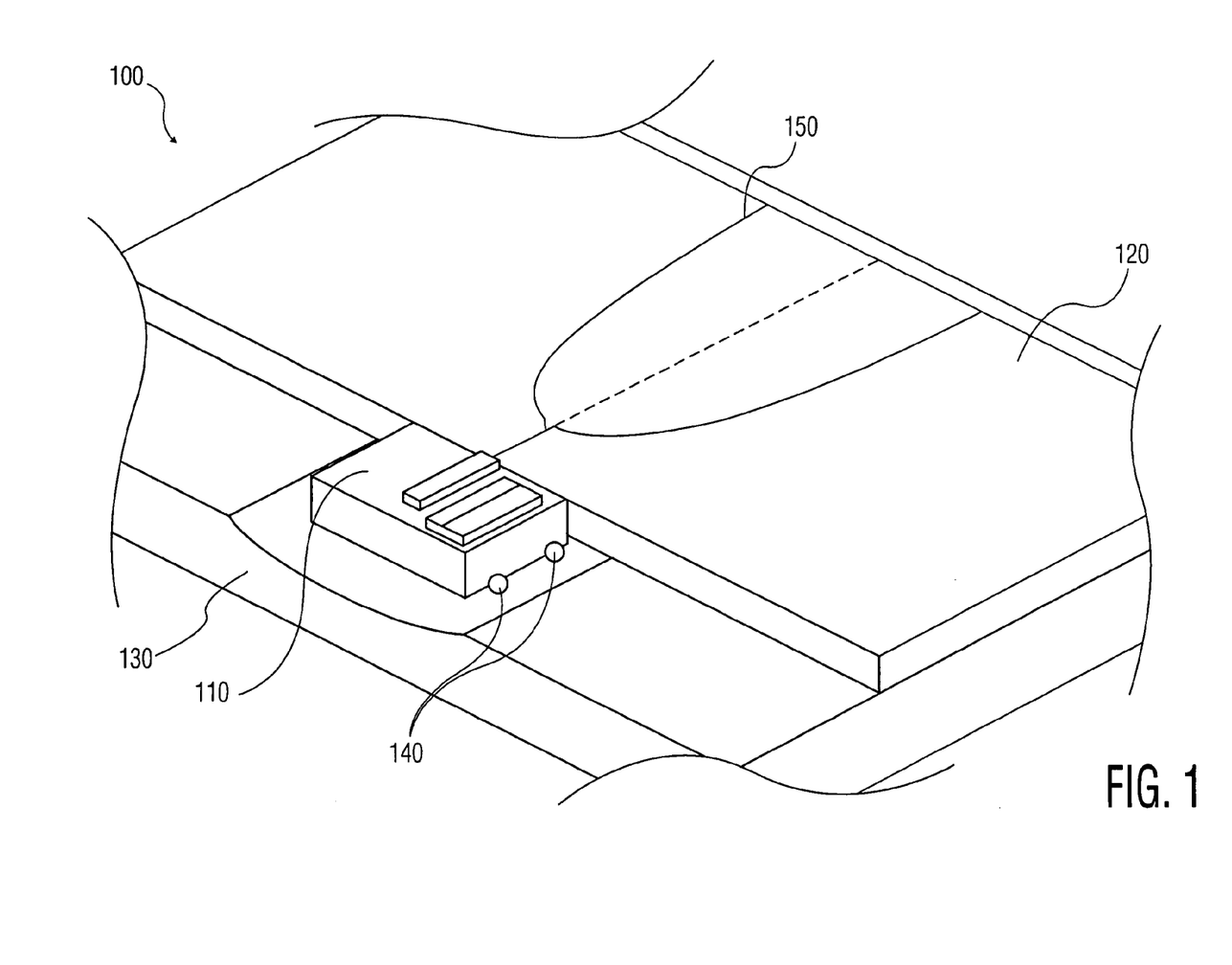
FIG. 1 is a perspective drawing illustrating an exemplary optical assembly which includes a laser diode as a first optical component and a waveguide as a second optical component according to an exemplary embodiment of the present invention.

FIG. 1 shows an exemplary embodiment of the invention. As shown in FIG. 1, optical assembly 100 includes laser diode 110. This first optical component may be aligned with planar waveguide 150 of planar waveguide structure 120. Although laser diode 110 and planar waveguide structure 120 are shown in FIG. 1 as the first optical component and the second optical component, these choices are merely illustrative and are not limiting. Exemplary optical assembly 100 also includes substrate 130 and a plurality of coupling elements 140 to attach laser diode 110 to the substrate.

Figure 2:
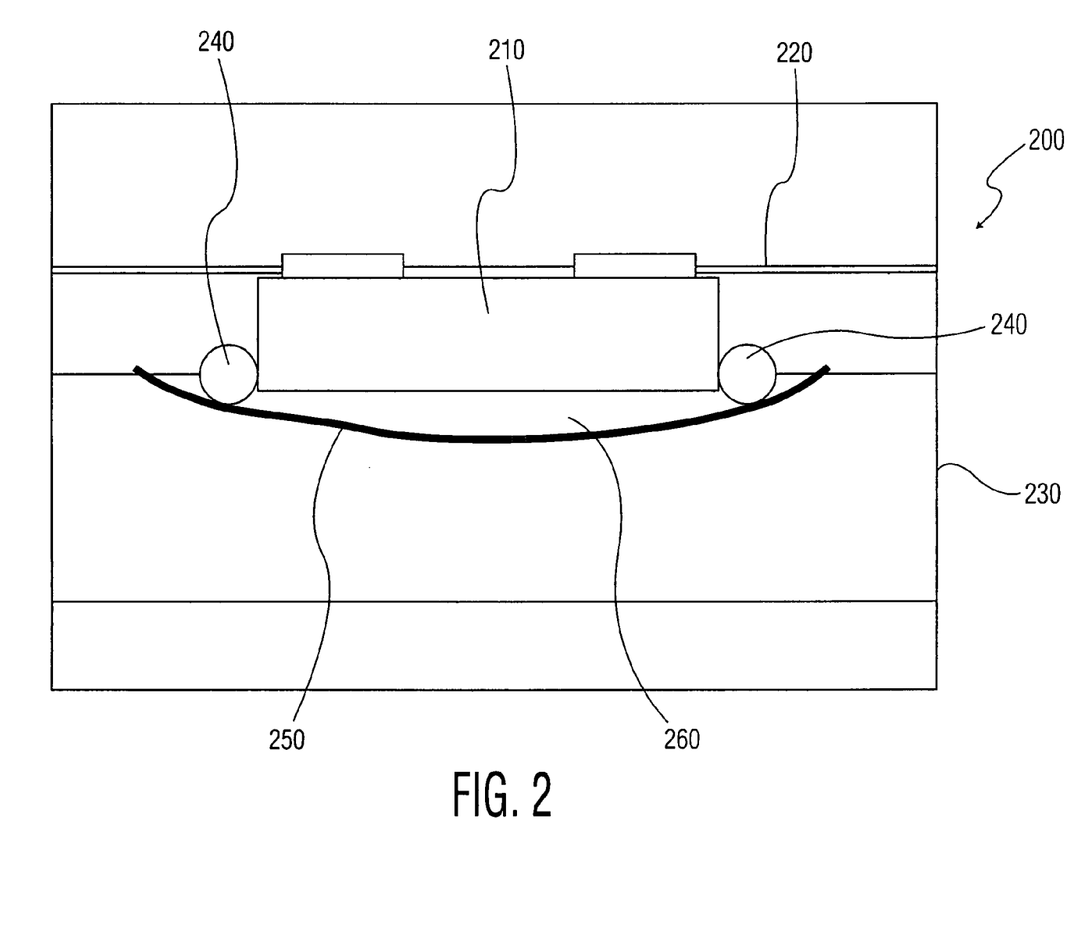
FIG. 2 is a front plan drawing of another exemplary optical assembly according to the present invention.

FIG. 2 illustrates a front view of another exemplary optical assembly. As shown in FIG. 2, first optical component 210 is attached to metallization layer 250, which may be formed on a top surface of substrate 230, by a plurality of coupling elements 240. After the first optical component 210 has been aligned with a second optical component 220 to a predetermined optical coupling quality threshold, an area 260 between the first optical component 210 and the metallization layer 250 may be filled with a fill material (not shown). The decision to fill the area 260 or not fill the area 260 is independent of the decision to place the metallization layer 250 onto the substrate or not place the metallization layer 250 onto the substrate.

Figure 3:
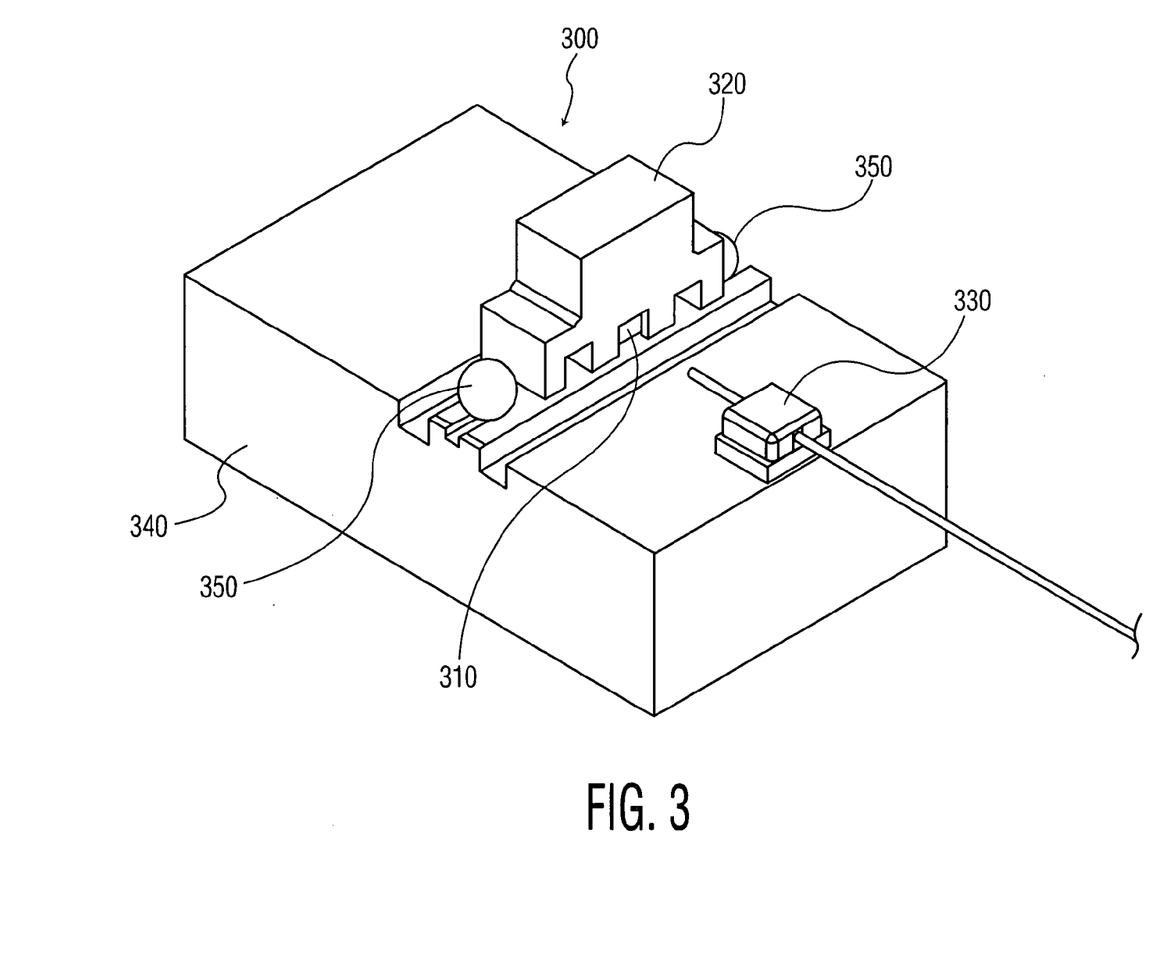
FIG. 3 is a perspective drawing illustrating an exemplary optical assembly which includes a lens coupled to a lens holder as a first optical component and an optical fiber as a second optical component according to an exemplary embodiment of the present invention.

FIG. 3 shows another exemplary optical assembly 300 in which the first optical component includes lens 310 coupled to lens holder 320. This first optical component may be aligned with optical fiber 330, i.e. the second optical component. This exemplary optical assembly also includes substrate 340 and coupling elements 350 to attach the first optical component to the substrate.

Figure 4:
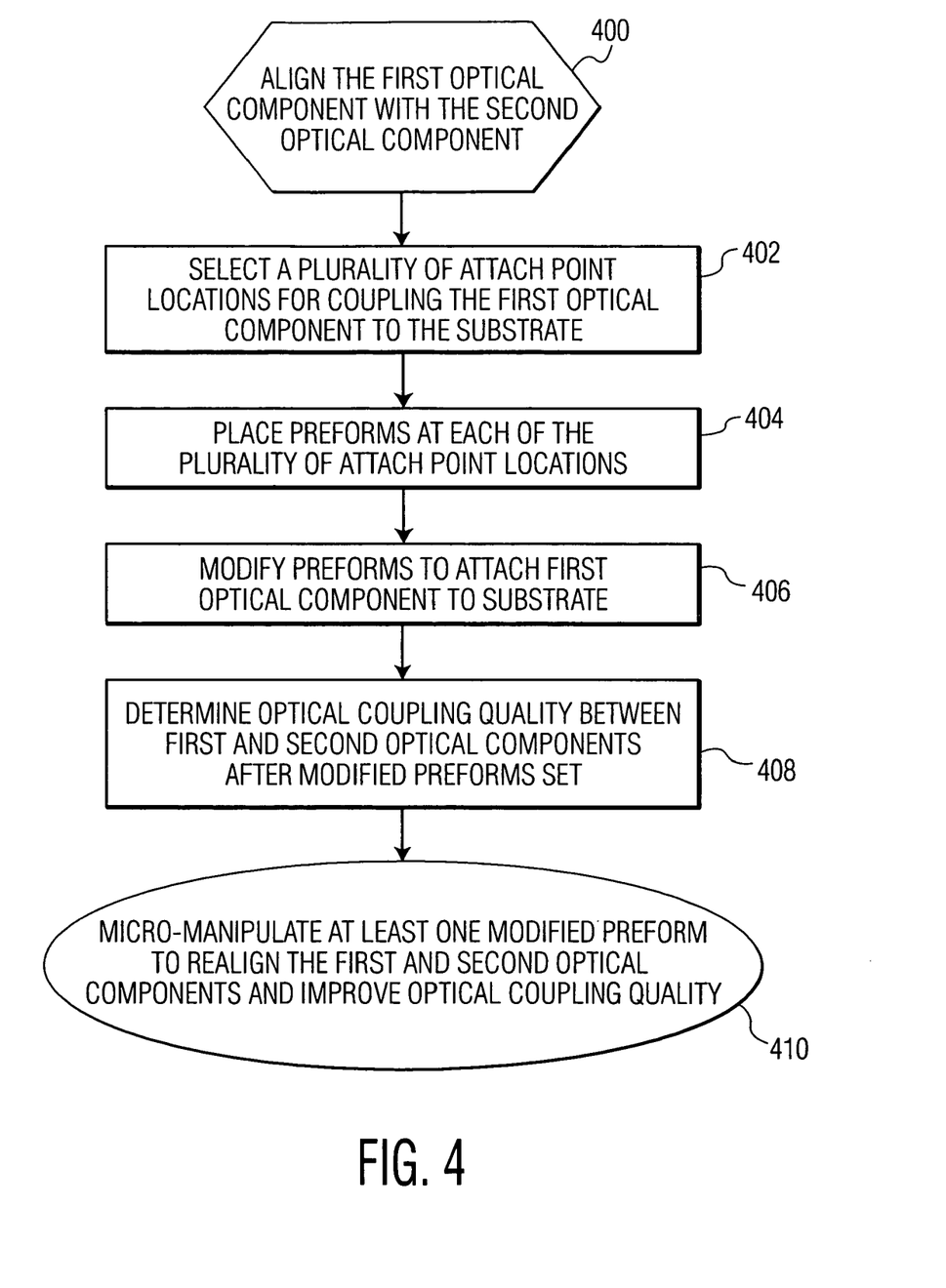
FIG. 4 is a flowchart illustrating an exemplary method for attaching a first optical component onto a substrate such that the first optical component is precisely aligned with a second optical component according to one embodiment of the present invention.

FIG. 4 is a flow chart diagram illustrating an exemplary method of attaching a first optical component onto a substrate such that the first optical component may be precisely aligned with a second optical component according to the present invention. At step 400, the first optical component is initially aligned with a second optical component. It is contemplated that the level of precision of this alignment may vary depending on the type of alignment system used and the coupling quality desired by the user. For example, the initial alignment may be a simplified alignment which may include only coarsely aligning the first optical component with the second optical component. Alternatively, the initial alignment may be a more precise alignment which may include aligning the first optical component along multiple axes with a sub-micron accuracy. Various positioners, such as mechanical or piezoelectric motion stages, may be used to position the first optical component.

The coupling quality achieved during the alignment may be determined by passively monitoring the first optical component and the second optical component using an optical camera based vision system or possibly a high precision interferometric technique. The alignment process may also include active monitoring of the optical coupling quality between the first optical component and the second optical component. It is noted that a combination of active and passive monitoring techniques may be employed to achieve the desired initial alignment. This monitoring of the optical coupling quality between the first optical component and the second optical component may be used to achieve a predetermined relative positioning or a predetermined optical coupling quality of the first and second optical components, or to maximize their optical coupling quality.

At step 402, the user selects a plurality of attach point locations for coupling the first optical component to the substrate. The location of the attach points and number of attach points depend upon the optical components that are being aligned. It is contemplated that the attach point locations may be at any location along any side of the first optical component and at any location on a surface of the substrate to attach the first optical component to the substrate. After the location of the attach points and number of attach points are chosen, in step 402, a coupling element is placed at each of the plurality of attach point locations, step 404. It is contemplated that the coupling elements may be made of a number of different materials used for mounting optical components, which have the desired thermal and mechanical properties. It is noted that the desired thermal and mechanical properties may vary depending on the type of the first optical component. These materials may include solder, thermally cured epoxy, ultraviolet (UV) cured epoxy, and air-cured epoxy. Exemplary solder preforms may desirably be formed of any solder alloy which has the desired thermal and mechanical properties, such as lead tin solder, gold-based solder, indium-based solder, gallium-based solder, bismuth-based solder, cadmium-based solder, or lead-free solder.

For example, as shown in FIG. 1, the coupling elements 140 may be placed at multiple locations along at least one side of laser diode 110. These exemplary coupling elements desirably have a melting point which is greater than the maximum operating temperature of laser diode 110, but less than the damage threshold temperature of the laser diode. A relatively low thermal expansion coefficient may be desirable for modified coupling elements 140 as well if laser diode 110 is anticipated to be operated over a significant temperature range. Additionally, the coupling elements desirably have sufficient rigidity to maintain the desired alignment between the optical components.

As shown in FIGS. 2 and 3, the coupling elements may desirably be placed on opposing sides of the optical component to be attached. The coupling elements may also be placed on metallization layer 250 on a top surface of the substrate, as shown in FIG. 2, to improve thermal and/or electrical conductivity and aid in the attachment of the first optical component to the substrate if solder preforms are used. The metallization layer may include at least one of gold, silver, aluminum, copper, titanium, tungsten, or nickel.

After the coupling elements have been placed at their desired locations, at step 406, the coupling elements are modified to attach the first optical component to the substrate. The method by which the coupling element is modified depends on the material from which the coupling element is formed. The coupling elements may be modified by applying energy to the coupling elements. For example, in the case of solder preforms, this energy may be applied to melt the solder preforms so that the first optical component may become attached to the substrate when the solder hardens. In the case of epoxy coupling elements, the coupling elements are in a plastic, or liquid, state when applied. Thermal energy may be applied to cure, i.e. harden, the thermally cured epoxy coupling elements, attaching the first optical component to the substrate. Similarly, UV cured epoxy coupling elements may be irradiated with UV light to cure the coupling elements and attach the first optical component to the substrate.

Air-cured epoxy coupling elements may not need energy to be applied for curing. They may be allowed to set until hardened, thus attaching the first optical component to the substrate.

The amount of energy that is used to modify the coupling elements is dependent upon the type of coupling element and the optical device. It is desirable to choose a solder with a higher melting point or annealing point than the operating temperature of the optical device and a lower melting point than the damage threshold or melting point of the optical device. If epoxy coupling elements are used, it is desirable to choose an epoxy with a higher melting point and/or glass transition point than the operating temperature of the optical device and a lower melting point than the damage threshold or melting point of the optical device. A process similar to the anneal-like process for solder (described below with reference to FIGS. 7A and 7B, may occur in epoxy at, or near, its glass transition point temperature. Desirably, the area near an optical component is heated as little as possible because the component may be susceptible to heat, which can cause performance of the device to decline. Heat may be conducted away from the device through the substrate. However, because this may allow some of the heat to escape, more energy may be needed to melt a volume of a coupling element, but the loss of too much heat in this manner may cause difficulties controlling the modifying process.

At step 408, an optical coupling quality between the first and second optical components is determined. As described above with respect to the determination of the pre-attachment optical coupling quality, the post-attachment optical coupling quality may be determined using an active or a passive monitoring technique. The attachment of the first optical component to the substrate caused by the modification of the coupling elements may cause the first optical component to move as the coupling elements deform and/or shrink slightly during the hardening process. This movement may cause the first optical component to become slightly misaligned with the second optical component, which may lead to a decreased optical coupling quality between the optical components. In addition, deformation and/or shrinkage of the coupling elements due to their modification may result in stress being placed on the first optical component. If the resulting stress is great enough, it may cause changes in the performance of the optical device. For example, referring to FIG. 1, stress on the laser diode 110 may affect the peak bandwidth of the laser output by either altering the bandgap of the material or the length of the laser cavity. Additionally, over time, this stress may cause the laser diode 110 or the substrate 130 to become detached from the modified coupling elements, reducing the lifetime of the optical component.

To improve the optical coupling quality between the optical components and/or reduce the stress caused by modifying the coupling elements, at step 410, at least one of the modified coupling elements is micro-manipulated. Selective micro-manipulation of the coupling elements may allow for small movements of the first optical component, thus helping to realign the first and second optical components and improve the optical coupling quality between them. Because the coupling elements are arranged in various positions around the first optical component, the stresses of each coupling element pull on the first optical component in different directions. Therefore, selective micro-manipulation of the coupling elements allows the user to move the first optical component in three dimensions and may be used to precisely align the first and second optical components, while also reducing the stress on the first optical component and improving the performance of the optical device. Selective micro-manipulation also allows the user to rotate the first optical component.

Micro-manipulation of the optical component may also include biasing the optical component in one direction with an external force. The user may choose to bias the optical component when the desired direction of movement of the optical component is known. Particularly, the user may choose to bias the optical component for larger movements. It has been found that biasing the optical component improves the micro-manipulation process for movements in the range of about tenths of microns to several microns and greater. It is contemplated, however, that biasing the optical component may be used for smaller or larger movements.

The micro-manipulation process may be continued until the optical coupling quality has been maximized. Alternately, an optical coupling quality threshold may be determined. The optical coupling quality threshold may be predetermined or may be determined from the optical coupling quality determined during the initial alignment of the first and second optical components in step 400.

As described above, multiple levels of precision and multiple alignment systems may be implemented for the initial alignment of the first and second optical components according to the user. For example, the initial alignment could include coarsely aligning the first and second optical components. In this case, the optical coupling quality threshold to be achieved during the micro-manipulation process in step 410 may be predetermined. Referring to FIG. 1, if using an active technique to monitor the optical coupling quality, the user may select a desired output power from the laser of, for example, 1 mW. The desired optical coupling quality threshold should then result in an output power of 1 mW. If using a passive technique to monitor the optical coupling quality then the user may select an optical coupling threshold based on the relative position of the two optical components.

Alternatively, the user may use the initial alignment in step 400 to determine the optical coupling quality threshold. For example, referring again to FIG. 1 and using an active optical quality monitoring technique, a more precise initial alignment may result in a measured output power from the laser of 1.3 mW. The user may use this output power achieved during the initial alignment to determine the optical coupling quality threshold. Depending on the confidence the user has in the initial alignment, the user may set the optical coupling quality threshold to achieve an output power of 1.25 mW, or 1.3 mW, or even 1.35 mW, for example.

Figure 5:
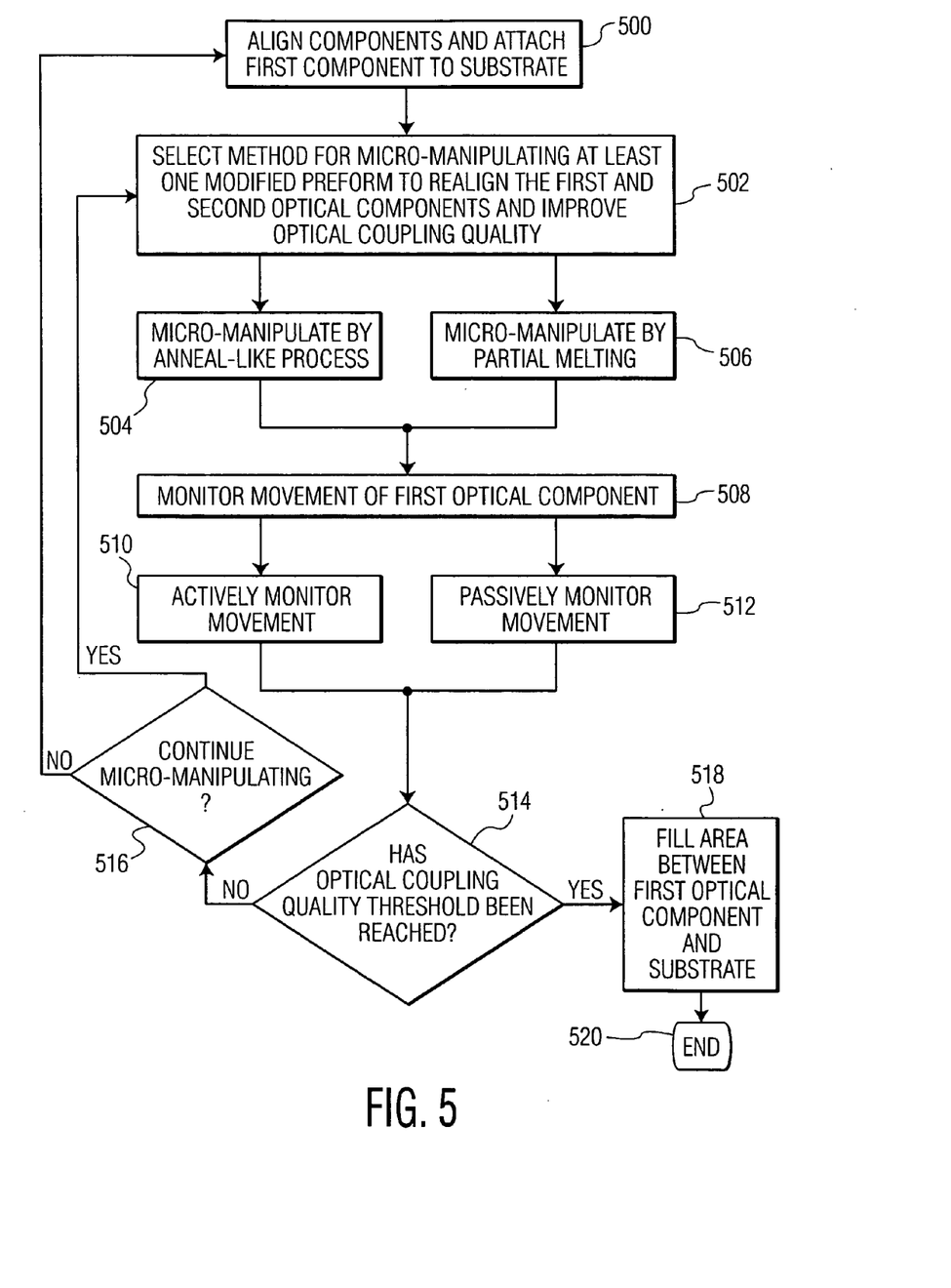
FIG. 5 is a detailed flowchart illustrating exemplary features of the exemplary method of FIG. 4.

FIG. 5 is a flow chart diagram illustrating, in more detail, certain portions of this exemplary embodiment according to the present invention. Step 500 summarizes the steps of aligning the first and second optical components and attaching the first optical component to the substrate as described above.

Figure 6A:
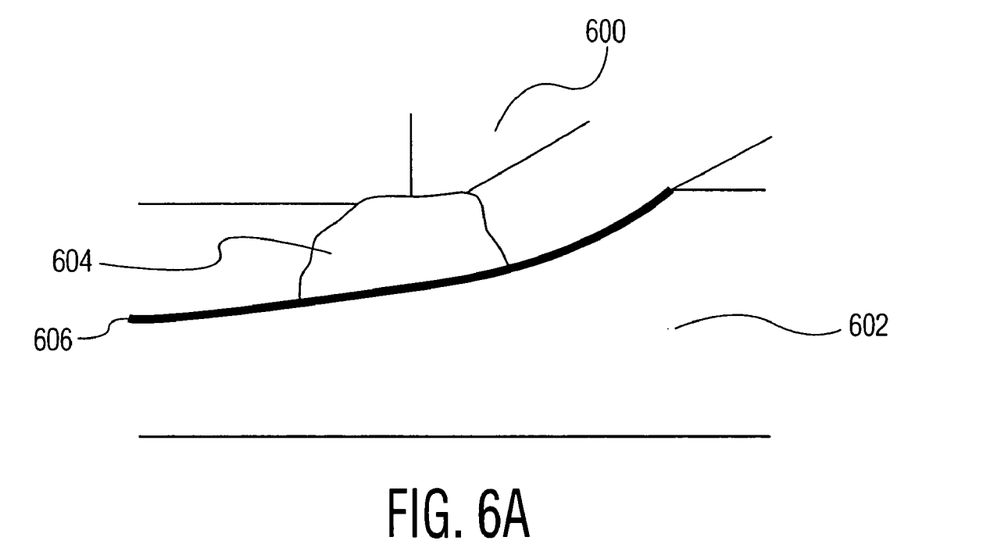
FIG. 6A is a front plan drawing illustrating a first optical component attached to a substrate by a modified coupling element.

At step 502, the user selects a method for micro-manipulating at least one of the modified coupling elements to realign the first and second optical components and improve the optical coupling quality. For example, the user may decide to micro-manipulate the modified coupling element (s) by partially melting the modified coupling element(s), step 506. FIG. 6A illustrates coupling element 604 that has been modified to attach first optical component 600 to metallization layer 606, which has been formed on the top surface of substrate 602 to aid in fixing the coupling element to the substrate and/or to improve the thermal conductivity between first optical component 600 and substrate 602.

Figure 6B:
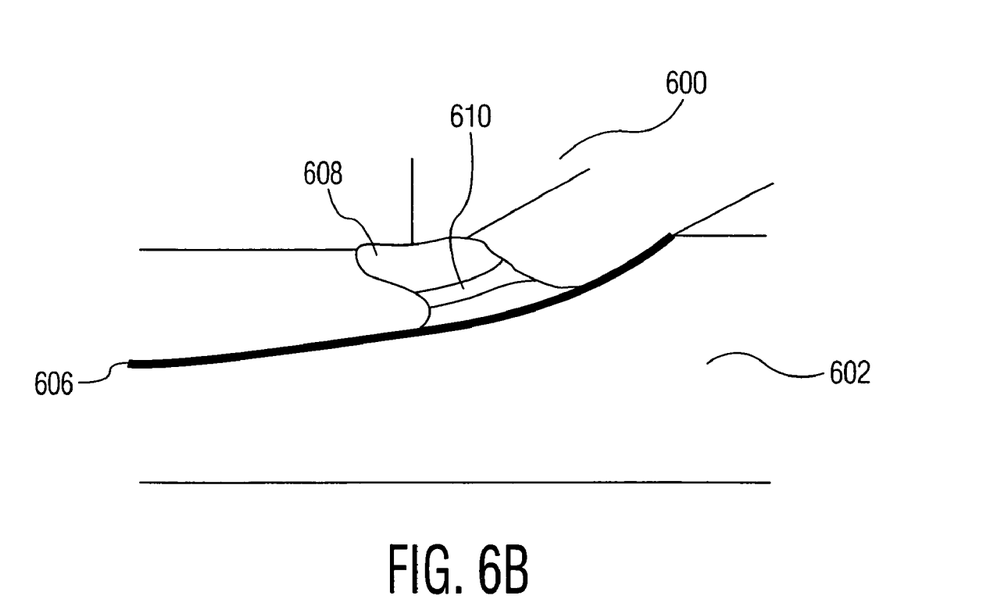
FIG. 6B is a front plan drawing of the first optical component and modified coupling element of FIG. 6A after an exemplary partial melting process is performed on the modified coupling element according to one embodiment of the present invention.

FIG. 6B shows exemplary micro-manipulated, modified coupling element 608. Micro-manipulated, modified coupling element 608 may be formed from modified coupling element 604 by partially melting a volume of the coupling element, shown as volume 610 in FIG. 6B. As shown in FIG. 6B, the shape of the micro-manipulated, modified coupling element 608 is altered by the partial melting of volume 610 which may allow a movement of first optical component 600. This small movement of first optical component 600 may release stress caused by the deformation and/or shrinkage of the coupling elements when they were hardened to attach first optical element to the substrate. Depending on the method used to melt volume 610, it may be possible to control the amount of stress relieved by control the duration of the period when volume 610 is melted. By selectively melting portions of one or more of the coupling elements to release portions of this stress, first optical component 600 may be moved in three dimensions to improve the optical coupling quality.

It is noted that the melted volume 610 may shrink when it cools and hardens, causing new stress on the coupling element, substrate and first optical component. Still, the amount stress on first the optical component 600 may be reduced using this exemplary partial melting technique to reallocate the stresses on modified coupling element 608. This is because the amount of new stress caused when melted volume 610 hardens is proportional to its volume. The smaller volume 610 of the modified coupling element is, the less stress on the optical component its hardening may cause. Thus, the new stress caused when melted volume 610 re-hardens is typically less than the amount of stress relieved due to the movement of the first optical component.

As discussed above, various epoxies may be chosen as the coupling element(s). Typically, epoxy has a lower thermal conductivity than solder. Therefore, because the heat does not escape with epoxy as quickly as with solder, less power may be needed to partially melt an epoxy coupling elements. Alternatively, the lower thermal conductivity of epoxy may allow more precise control of volume 610 to be melted. However, it is noted that, during operation, the lower thermal conductivity of the epoxy coupling elements may cause the optical component to heat up, affecting its performance.

It is contemplated that, in the exemplary micro-manipulation method illustrated in FIGS. 6A and 6B, the material of volume 610 may be heated until it becomes plastic, rather than completely melting this material.

Figure 8:
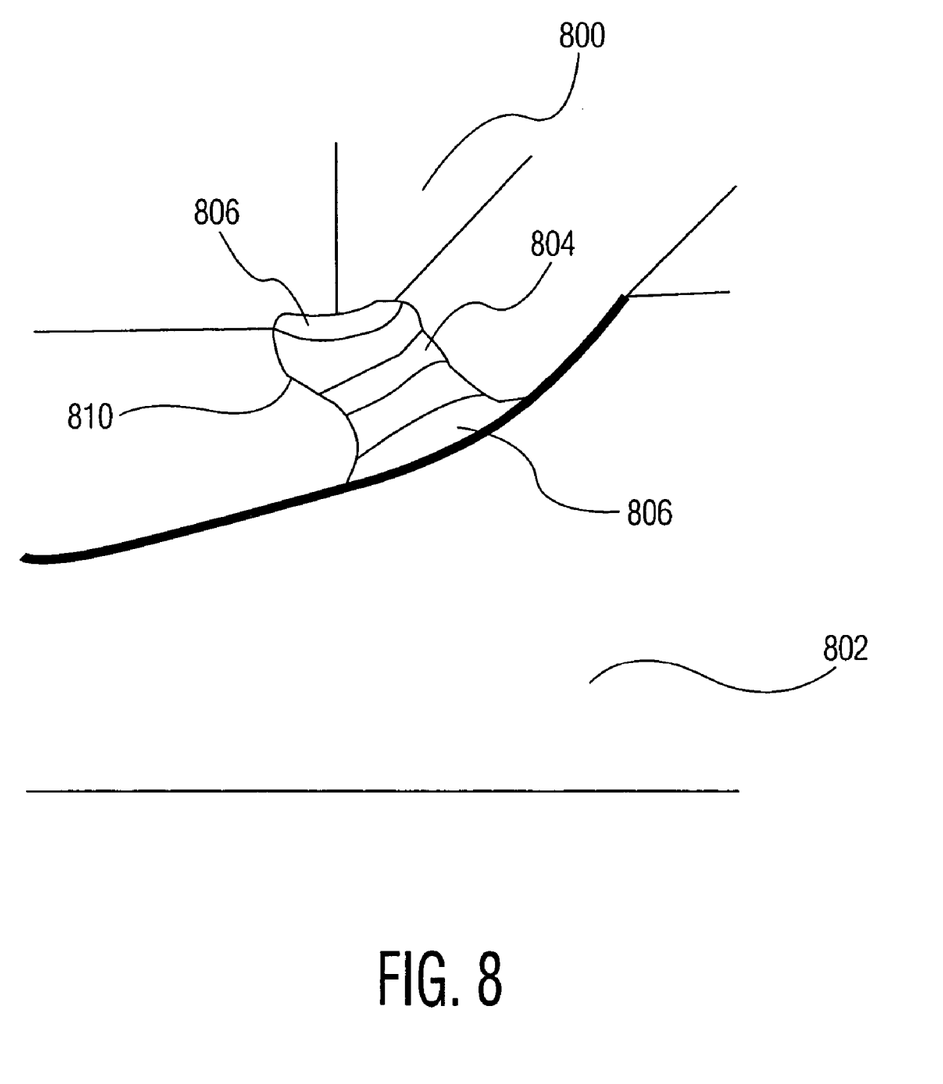
FIG. 8 is a perspective drawing of a first optical component attached to a substrate useful for describing exemplary embodiments of the present invention.

Referring to FIG. 8, the user may select a number of different locations of modified coupling element 810 to melt. Desirably, the user may select a volume similar to the location of volume 804. This exemplary location may be sufficiently far removed from substrate 802 that the heat used to melt the volume is not rapidly conducted away via the substrate, and far enough away from optical component 800 to reduce the likelihood of thermally damaging the optical component. If the user selects a volume similar to the location of volume 806, it is desirable to carefully control the application of the heat or the first optical component could be damaged during the melting process. If the user selects a volume similar to the location of volume 806, the heat may be conducted away too rapidly via the substrate so that more energy may be needed to melt this portion of modified coupling element 810, which may result in process control issues and/or increased costs. It is noted, however, that if the heat used in this exemplary micro-manipulation process is applied through substrate 802, then volume 806 is the volume to be melted.

Figure 7A:
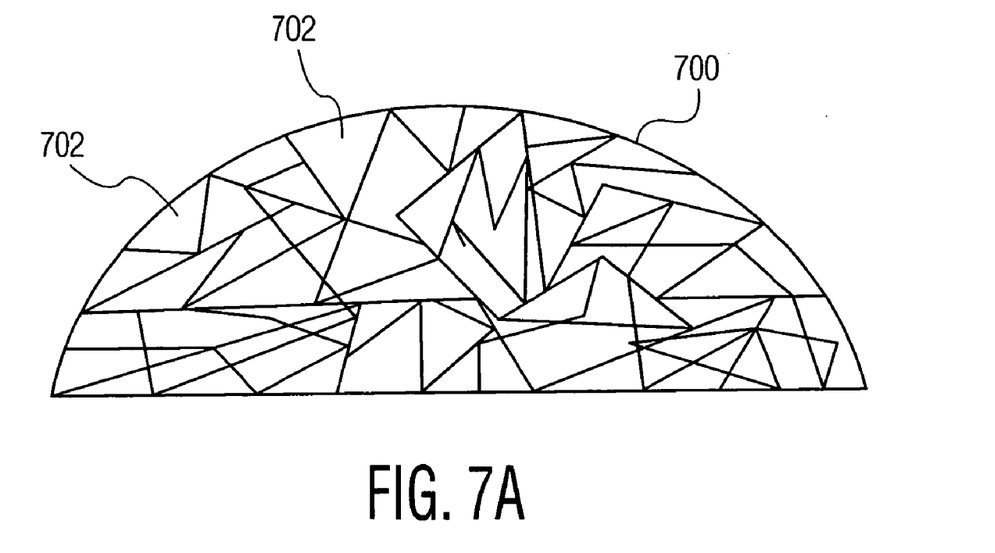
FIGS. 7A and 7B are cut-away, side plan drawings of a modified solder preform before and after, respectively, an exemplary anneal-like process is performed on the modified solder preform according to one embodiment of the present invention.
Figure 7B:
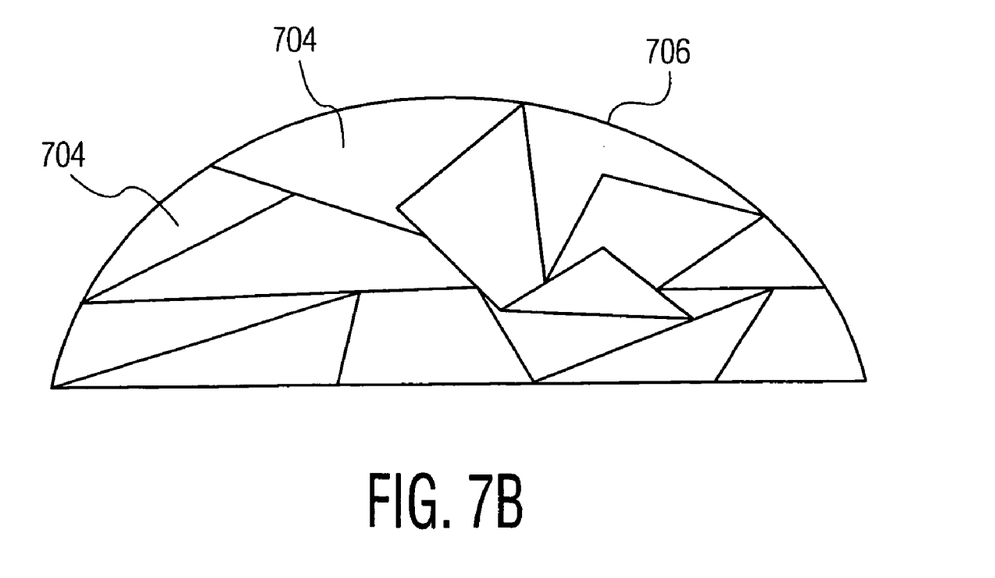

Referring back to FIG. 5, the user may, alternatively, select to micro-manipulate the modified coupling element by an anneal-like process at step 504. FIGS. 7A and 7B are cut-away, side-views illustrating an exemplary modified solder preform before and after an anneal-like process is performed on the exemplary modified solder preform, respectively. It is noted that, although these figures are used to describe the anneal-like procedure for coupling elements formed of solder, a similar process may occur with exemplary epoxy coupling elements.

Prior to the anneal-like process, grains 702 within modified solder preform 700 are of a certain size and number. These pre-anneal grains may be relatively small and numerous due to the rapid cooling of the solder. Energy may be applied to heat the solder material, causing the solder to undergo change similar to annealing a metal or crystal. This change may include a reallocation of the grain boundaries within the solder material that may also change the shape and size of the grains. Often, this reallocation of grain boundaries results in larger grain sizes. After this anneal-like process, as shown in FIG. 7B, the grain boundaries are reallocated, resulting in post-anneal grains 704 in annealed, modified solder preform 706. Pre-anneal grains 702 may form together to become larger post-anneal grains 704. The reorganization of the solder material as these larger grains may result in a reduction of stress in the optical device, by subtle deformation of annealed, modified coupling element 706. This shape change may also cause a slight movement of the first optical component. The stress on the other modified coupling elements may also be reduced by the movement of the optical component.

A scanning-tunneling microscope (STM) or an atomic force microscope (AFM) may be used to measure the grains on the surface of the annealed, modified coupling element, if monitoring of these grains is desired. It is contemplated that other material inspection devices may be used to measure the grain sizes of annealed, modified coupling elements, as well. The inventors have determined that this exemplary anneal-like process works particularly well in Au—Sn solders.

Although either exemplary micro-manipulation process may be chosen, desirably, the anneal-like process may be chosen for smaller movements of the components and the partial melting process may be chosen when larger movements of the components are desired. For example, the user may choose to use an anneal-like process for moving the first optical component small distances of 1 µm, or less, but choose to partially melt at least one modified coupling element for moving the first optical component larger distances of several microns.

Various methods may be used to apply the heat used in the micro-manipulation process. For example, the user may micro-manipulate a modified coupling element by laser pulse heating. This exemplary method may provide very precise control of the location and volume of the coupling element being micro-manipulated. At least one pulse of laser light from a pulsed laser source, such as a pulsed direct diode laser, a pulsed carbon dioxide laser, a pulsed argon laser, a pulsed titanium sapphire laser, a pulsed solid state laser, a pulsed fiber laser, or a pulsed excimer laser, may be used to irradiate the modified coupling element. A number of parameters of the pulsed laser may depend on the material of the modified coupling elements and the micro-manipulation process being used, but in any case it is desirable for the pulses of laser light incident on the modified coupling element to have a fluence that is less than the ablation threshold of the material of the modified coupling elements. It has been found that lasers with an output power in a range of about 4 W to about 40 W, and pulse widths in the range of about 10 µs to about 10 ms, perform well for micro-manipulating coupling elements formed of Au—Sn solder, however, other ranges of power, and/or pulse width, may be used, depending on factors such as spot size and coupling element material. It is noted that short pulse lengths may allow the user to have more control over the modification process. That is, these shorter pulses may provide higher power levels to modify the coupling elements with less total energy. Thus, the use of such pulses may reduce the possibility of thermally damaging the optical component during the micro-manipulation process and adversely affecting later performance of the optical device.

Another exemplary heating method the user may select to micro-manipulate the modified preforms is resistive heating. Resistive heating of the coupling element may be accomplished by applying an electrical current to a metallization layer formed on a top surface of the substrate, such as metallization layer 250 shown in FIG. 2. Alternatively, the coupling element may be directly heated by resistive heating, i.e. an electrical current may be passed directly through the modified coupling element. The use of laser pulse heating may reduce the chance of static discharge that may potentially damage the optical components. However, resistive heating may also reduce the chance of static discharge because of the use of probes to apply current, rather than touching the device. Electrically insulating epoxy coupling elements provide a lower chance of static discharge than solder preforms, or conductive epoxy coupling elements, but direct resistive heating is not practical for electrically insulating epoxy coupling elements. It is also noted that the use of a pulsed laser heating technique may provide a more precise control of the portions of the coupling element(s) to be micro-manipulated, but the use of a direct resistive heating technique may provide a more even heating of the coupling element, which may be desirable during the anneal-like process.

Referring again to FIG. 5, at step 508 the user may monitor the movement of a first optical component as the at least one modified coupling element is being micro-manipulated. The monitoring may include passively monitoring the movement of the first optical component at step 512. This passive monitoring may include using a high precision interferometric technique or monitoring the movement of the first optical component with an optical camera based vision system. The monitoring may also include actively monitoring the movement of the first optical component, by monitoring the optical coupling quality between the first and second optical components at step 510. It is contemplated that multiple levels of precision and multiple monitoring systems may be implemented according to desires of the user.

As described above, an optical coupling quality threshold may be determined in multiple ways based on multiple factors. As the user monitors the movement of the optical component at step 508, either actively, step 510, or passively, step 512, the user may determine if the desired optical coupling quality threshold has been reached at step 514.

If the desired optical coupling quality threshold has been reached, the user may choose to fill the gap between the first optical component and the substrate with a fill material at step 518. Desirably, the coupling elements have sufficient mechanical stability to maintain the positioning of the first optical element (and thus the optical coupling quality), but the relatively small cross-section of the coupling elements may not provide an adequate amount of heat transfer to maintain a desired operating temperature. Therefore, fill material may added to increase the heat transfer between the first optical device and the substrate. The fill material is desirably a thermally conductive material. Although, typically not the primary function of the fill material, the fill material may also help prevent any further movement of the optical device. The exemplary micro-manipulation process of FIG. 5 is then complete, step 520.

If it is found in step 514 that the optical coupling quality threshold has not been reached, the user may continue the micro-manipulation process, by micro-manipulating another modified coupling element or further micro-manipulating a previously micro-manipulated, modified coupling element at step 516. The user may also determine that continued micro-manipulation is unlikely to result in reaching the optical coupling quality threshold or that it is desirable to apply a bias force before continuing. If the user determines that continued micro-manipulation is unlikely to result in reaching the optical coupling quality threshold, the user may then start the entire process over at step 500 by reattaching the first optical component. If the user continues with the micro-manipulation process, the user may again select a method for micro-manipulating a modified coupling element, step 502. The user need not select the same micro-manipulation method previously used.

Although the invention is illustrated and described herein with reference to specific embodiments, the invention is not intended to be limited to the details shown. Rather, various modifications may be made in the details within the scope and range of equivalents of the claims and without departing from the invention. Specifically, it is contemplated that more than one optical component in a single optical device may be precisely aligned using one of the exemplary embodiments of the present invention.

What is claimed:

1. A method precisely aligning a first optical component to a second optical component that is coupled to a substrate, the first optical component being coupled to the substrate by a plurality of existing coupling elements, the method comprising the steps of:
   a) micro-manipulating at least one of the plurality of existing coupling elements by a heat treatment exclusive of any mechanical manipulation to align the first optical component with the second optical component;
   b) monitoring the movement of the first optical component as the at least one of the plurality of existing coupling elements is micro-manipulated;
   c) repeating steps (a) and (b) until an optical coupling quality threshold is reached; and
   d) repeating steps (a), (b) and (c) using a different one of the plurality of existing coupling elements.

2. A method according to claim 1, wherein step (a) includes micro-manipulating the at least one of the plurality of existing coupling elements by performing at least one of an annealing process or a partial melting process on the at least one of the plurality of existing coupling elements.

3. A method according to claim 1, wherein step (a) includes micro-manipulating the at least one of the plurality of existing coupling elements by laser pulse heating.

4. A method according to claim 3, wherein micro-manipulating the at least one of the plurality of existing coupling elements by laser pulse heating includes irradiating the at least one of the plurality of existing coupling elements with laser light having a fluence less than an ablation threshold of the at least one of the plurality of existing coupling elements.

5. A method according to claim 3, wherein micro-manipulating the at least one of the plurality of existing coupling elements by laser pulse heating includes irradiating the at least one of the plurality of existing coupling elements with at least one pulse of laser light with a pulse length in the range of about 10 μs to about 10 ms.

6. A method according to claim 1, wherein step (a) includes micro-manipulating the at least one of the plurality of existing coupling elements by resistive heating of the at least one of the plurality of existing coupling elements.

7. A method according to claim 6, wherein micro-manipulating the at least one of the plurality of existing coupling elements by resistive heating includes applying an electrical current to at least one of a metallization layer formed on a top surface of the substrate or the least one of the plurality of existing coupling elements.

8. A method according to claim 1, wherein step (b) includes at least one of:
   monitoring the movement of the first optical component using a high precision interferometric technique;
   monitoring the movement of the first optical component with an optical camera based vision system; or
   actively monitoring an optical coupling quality between the first optical component and the second optical component.

9. A method according to claim 1, wherein step (a) includes applying a bias force to the first optical component.

10. A method for attaching a first optical component onto a substrate such that the first optical component is precisely aligned with a second optical component coupled to the substrate, the method comprising the steps of:
    (a) aligning the first optical component with the second optical component;
    (b) selecting a plurality of attach point locations at which to couple the first optical component to the substrate;
    (c) placing a coupling element at each of the plurality of attach point locations;
    (d) modifying the plurality of coupling elements to attach the first optical component to the substrate;
    (e) determining an optical coupling quality of the first optical component to the second optical component with the plurality of modified coupling elements; and
    (f) micro-manipulating at least two of the plurality of modified coupling elements by a heat treatment exclusive of any mechanical manipulation to realign the first optical component with the second optical component and improve the optical coupling quality.

11. A method according to claim 10, wherein step (f) includes micro-manipulating the at least two of the plurality of modified coupling elements by performing at least one of an anneal-like process or a partially melting process on the at least two of the plurality of coupling elements.

12. A method according to claim 10, the method further comprising the step of:
    (g) filling an area between the first optical component and the substrate with a fill material.

13. A method according to claim 10, wherein step (a) includes at least one of:
    aligning the first optical component and the second optical component using a high precision interferometric technique;
    aligning the first optical component and the second optical component with an optical camera based vision system; or
    actively aligning the first optical component and the second optical component.

14. An optical assembly comprising:
    a substrate;
    a plurality of coupling elements including at least two micro-manipulated coupling elements that are micro-manipulated by a heat treatment exclusive of any mechanical manipulation;
    a first optical component coupled to the substrate by the plurality of coupling elements; and
    a second optical component coupled to the substrate; wherein the first optical component is precisely aligned with the second optical component to achieve a predetermined optical coupling quality using the at least two micro-manipulated coupling elements of the plurality of coupling elements.

15. An optical assembly according to claim 14, further comprising a fill material between the first optical component and the substrate.

16. An optical assembly according to claim 14, wherein:
    the substrate includes a metallization layer on a top surface of the substrate; and
    the plurality of coupling elements are coupled to the metallization layer.

17. An optical assembly according to claim 16, wherein the metallization layer includes at least one of gold, silver, aluminum, copper, titanium, tungsten, or nickel.

18. An optical assembly according to claim 14, wherein the plurality of coupling elements are formed of at least one of lead tin solder, gold-based solder, indium-based solder, gallium-based solder, bismuth-based solder, cadmium-based solder, lead-free solder, thermally cured epoxy, air-cured epoxy or ultraviolet cured epoxy.

19. An optical assembly according to claim 14, wherein:
the first optical component includes at least one of a laser diode, a semiconductor optical amplifier, a variable optical attenuator, an electroabsorption modulator, a Mach-Zehnder interferometer, an optical transmitter, an optical transponder, a planar waveguide structure, a Bragg grating structure, a photonic crystal structure, a lens, an optical isolator, an electro optical switch, a Pockels cell, a Kerr cell, a liquid crystal device, a polarizing element, a harmonic generation crystal, an optical fiber assembly, a monolithically integrated optical chip, or a photodetector; and
the second optical component includes at least one of a laser diode, a semiconductor optical amplifier, a variable optical attenuator, an electroabsorption modulator, a Mach-Zehnder interferometer, an optical transmitter, an optical transponder, a planar waveguide structure, a Bragg grating structure, a photonic crystal structure, a lens, an optical isolator, an electro optical switch, a Pockels cell, a Kerr cell, a liquid crystal device, a polarizing element, a harmonic generation crystal, an optical fiber assembly, a monolithically integrated optical chip, or a photodetector.

20. An optical assembly according to claim 14, wherein the substrate includes at least one of a glass layer, a silicon layer, a germanium layer, an alumina layer, a sapphire layer, a III/V semiconductor material layer, an oxide layer, a metal layer, an epoxy layer, a ceramic layer, or a cermet layer.

21. An optical assembly according to claim 14, wherein grain boundaries of grains of the at least two micro-manipulated coupling elements are reallocated.

22. An optical assembly according to claim 21, wherein reallocating the grain boundaries of the grains of the at least two micro-manipulated coupling elements results in a change of a size of at least one of the grains.

* * * * *